United States Patent
Mwanje et al.

(10) Patent No.: US 11,888,706 B2
(45) Date of Patent: Jan. 30, 2024

(54) CONTROLLING COGNITIVE FUNCTIONS IN A NETWORK

(71) Applicant: NOKIA SOLUTIONS AND NETWORKS OY, Espoo (FI)

(72) Inventors: Stephen Mwanje, Dorfen (DE); Janne Ali-Tolppa, Taufkirchen (DE); Jürgen Goerge, Neuried (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/618,753

(22) PCT Filed: Jun. 19, 2019

(86) PCT No.: PCT/EP2019/066169
§ 371 (c)(1),
(2) Date: Dec. 13, 2021

(87) PCT Pub. No.: WO2020/253953
PCT Pub. Date: Dec. 24, 2020

(65) Prior Publication Data
US 2022/0263726 A1 Aug. 18, 2022

(51) Int. Cl.
*H04L 29/08* (2006.01)
*H04L 41/16* (2022.01)
*H04L 41/14* (2022.01)
*H04L 41/147* (2022.01)

(52) U.S. Cl.
CPC ............ *H04L 41/16* (2013.01); *H04L 41/145* (2013.01); *H04L 41/147* (2013.01)

(58) Field of Classification Search
CPC .............................. H04L 41/16; H04L 41/145
See application file for complete search history.

(56) References Cited

U.S. PATENT DOCUMENTS

| | | | |
|---|---|---|---|
| 11,373,119 B1 * | 6/2022 | Doshi | H04L 47/70 |
| 2017/0091632 A1 | 3/2017 | Sanchez et al. | |
| 2017/0279830 A1 | 9/2017 | Mermoud et al. | |
| 2022/0121168 A1 * | 4/2022 | Kurahashi | G06F 11/3003 |

FOREIGN PATENT DOCUMENTS

WO    WO 2018/233818 A1    12/2018

OTHER PUBLICATIONS

International Search Report and Written Opinion dated Feb. 5, 2020 corresponding to International Patent Application No. PCT/EP2019/066169.

Radwa Elshawi et al., "Automated Machine Learning: State-of-the-Art and Open Challenges," Arxiv.org, Jun. 5, 2019, XP081373685.

* cited by examiner

*Primary Examiner* — Adnan M Mirza
(74) *Attorney, Agent, or Firm* — SQUIRE PATTON BOGGS (US) LLP (57) ABSTRACT

Cognitive functions in a network, each comprising a learning module adapted to observe characteristics of the network and an inference module adapted to conclude, from the characteristics observed by the learning module, on a behavior of the network resulting from the observed characteristics, are controlled by halting and/or restarting operation of the learning module of a cognitive function of the cognitive functions, where operation of the inference module of the cognitive function is controlled independently from the halting and/or restarting the operation of the learning module of the cognitive function.

20 Claims, 4 Drawing Sheets

CONTROLLING COGNITIVE FUNCTIONS IN A NETWORK

TECHNICAL FIELD

At least some example embodiments relate to Cognitive Autonomous Networks (CAN) in 5G (radio access) networks and other (future) generations of wireless/mobile networks. In particular, at least some example embodiments relate to controlling cognitive functions in such networks. For example, at least some example embodiments relate to controlling states of the cognitive functions. In the following, cognitive functions will also be referred to as cognitive network functions.

LIST OF ABBREVIATIONS

3CF Configuration, Control, and Coordination Function
3GPP Third Generation Partnership Project
5G Fifth Generation
CAN Cognitive Autonomous Network
CF Cognitive Function
CNM Cognitive Network Management
IOC Information Object Class
KPI Key Performance Indicator
MO Managed Object
NE Network Element
NF Network Function
NRM Network Resource Model
OAM Operations, Administration and Management
SON Self-Organizing Network

BACKGROUND

As a paradigm for intelligent autonomy in networks, CAN will ensure that Operations, Administration and Management (OAM) functions be able to 1) take higher level goals and derive the appropriate performance targets, 2) learn from their environment and their individual or shared experiences therein, 3) learn to contextualize their operating conditions and, 4) learn their optimal behavior fitting to the specific environment and contexts. A CAN function control cycle operates in five steps:
 1. Observe the state of the network, e.g. based on Key Performance Indicators (KPIs).
 2. Infer higher level insights on the state based on previously learned models.
 3. Decide on the optimal course of action based on the insight, e.g. reconfiguring a network function.
 4. Plan the deployment of the changes and deploy them.
 5. Observe the impact of the changes in the network (looping back to step 1) and additionally learn and update the model based on the experience.

Cognitive functions actively learn on the network to profile the behavior of the network and to learn how to respond to the different contexts in the network.

SUMMARY

At least some example embodiments are directed to appropriately controlling learning, inferring or taking action in cognitive functions. For example, at least some example embodiments solve a problem of suspending learning, inferring or taking action in cognitive functions, when required.

This is achieved by a method of controlling cognitive functions, an apparatus for controlling cognitive functions and a non-transitory computer-readable storage medium as specified by the appended claims.

According to at least some embodiments, learning, inference and action states of cognitive network functions can be controlled in a consistent, inter-operable and future-proof way, by using a state management concept.

In the following, example embodiments and example implementations will be described with reference to the accompanying drawings.

DESCRIPTION OF EXAMPLE EMBODIMENTS

As mentioned above, cognitive functions actively learn on a network to profile behavior of the network and to learn how to respond to different contexts in the network. The learning process needs to be appropriately managed to ensure that the right models are learned.

A cognitive function will adapt its behavior to its context. There may be occasions where the learning capability of a cognitive function may be impaired, or observations by the cognitive function are known not to represent the typical context of the cognitive function and an operator may wish to exclude such observations from a training of CAN functions. For example, an anomaly detection function profiles the behavior of the network or a Network Function (NF) to learn how it typically behaves. A known anomalous time period should in most cases be excluded from profiling, since otherwise it may skew learning data from an intended context. A more concrete example could be a special event, which is expected to produce unusual data. Another example could be a known malfunction of a profiled function.

This is somewhat analogous to a Network Element (NE) maintenance mode, where the operator instructs the network element to discard any alarms to avoid sending false alarms to a management system while the NE is undergoing maintenance procedures. Even when an NE or an NF is not in the maintenance mode, there may be occasions where learning by the cognitive function is wanted to be suspended in a non-learning state. This applies especially to reinforcement learning, where the cognitive function is constantly learning from feedback to its actions. If the cognitive function learns from observed outcomes that are known to be abnormal, it will wrongly interpret the effect of its actions.

Similarly, an operator may want to suspend inference of a cognitive function, if insights are known to be erroneous, or any control actions executed by the cognitive function, if they may be known to be harmful.

In case the cognitive function itself detects a degradation in its internal process, it requires a way to indicate this to any services depending on it, including any services managing it. The function may either be unable to learn, infer or act based on data it is collecting and its internal state. It may for example detect that the model used for inference is no longer performing well, in which case a retraining is needed. According to at least some example embodiments to be described in more detail below, a method is provided which enables communication of such observations.

Figure 1:
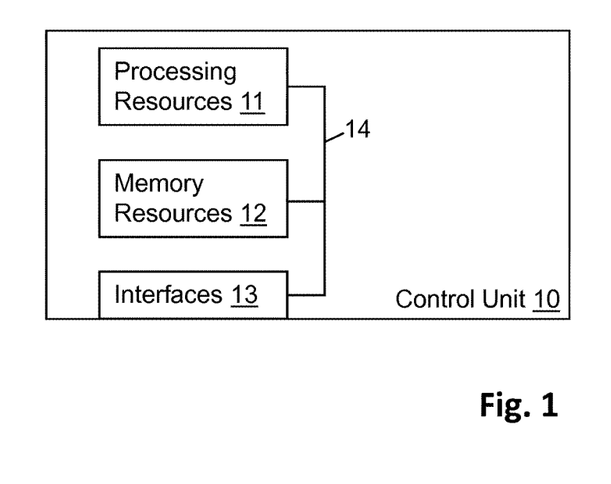
FIG. 1 shows a schematic block diagram illustrating a configuration of a control unit in which examples of embodiments are implementable.

As a preliminary matter before exploring details of various example implementations, reference is made to FIG. 1 for illustrating a simplified block diagram of an electronic device that is suitable for use in practicing at least some example embodiments.

FIG. 1 shows a control unit 10 which comprises processing resources (e.g. processing circuitry) 11, memory resources (e.g. memory circuitry) 12 and interfaces (e.g. interface circuitry) 13, which are coupled by a connection 14.

Further, as used in this application, the term "circuitry" refers to one or more or all of the following:
 (a) hardware-only circuit implementations (such as implementations in only analog and/or digital circuitry) and
 (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
 (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

According to at least some example embodiments, the memory resources 12 include a program that, when executed by the processing resources 11, enable the control unit 10 to operate in accordance with the example embodiments and example implementations, as detailed below.

In general, at least some example embodiments are implemented by computer software stored in the memory resources 12 and executable by the processing resources 11, or by hardware, or by a combination of software and/or firmware and hardware.

The control unit 10 is adapted to execute a method of controlling cognitive functions in a network according to at least some example embodiments.

Figure 2:
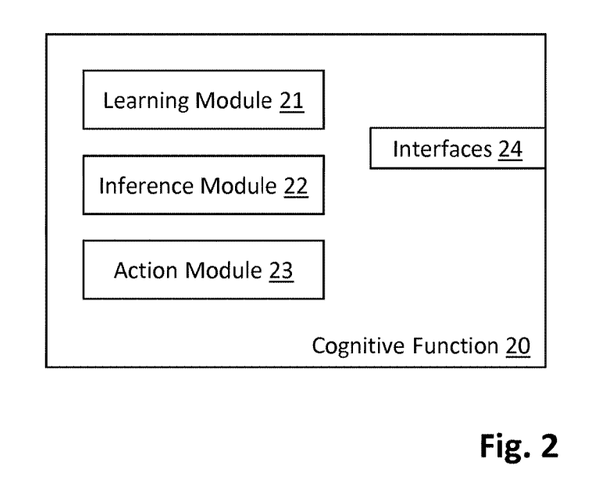
FIG. 2 shows a schematic diagram illustrating a configuration of a cognitive network function according to at least some example embodiments.

FIG. 2 illustrates a configuration of a cognitive function 20 according to at least some example embodiments.

According to at least some example implementations, the cognitive function 20 comprises the control unit 10.

According to at least some example embodiments, the cognitive function 20 comprises a learning module 21 adapted to observe characteristics of the network and an inference module 22 adapted to conclude, from the characteristics observed by the learning module 21, on a behavior of the network resulting from the observed characteristics.

According to at least some example embodiments, the cognitive function 20 further comprises an action module 23 adapted to plan, from the behavior of the network concluded by the inference module 22, specific actions to affect an overall behavior of the network.

According to at least some example embodiments, operation of the learning module 21 is controlled independently from operation of the inference module 22.

Figure 3:
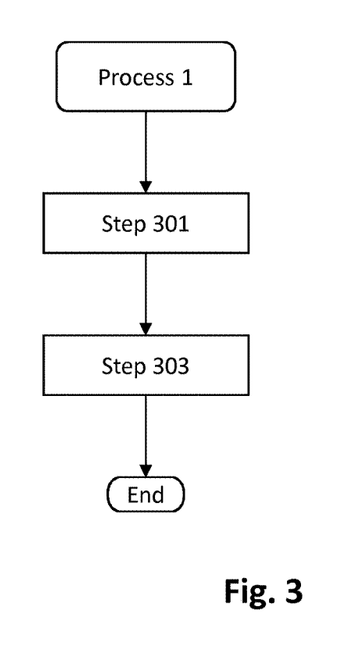
FIG. 3 shows a flowchart illustrating a process of controlling cognitive network functions according to at least some example embodiments.

FIG. 3 illustrates a process 1 according to at least some example embodiments. The process 1 comprises the method of controlling cognitive functions in a network according to at least some example embodiments.

According to at least some example embodiments, in step S301 of FIG. 3, operation of the learning module 21 is controlled. In step S303 of FIG. 3, operation of the inference module 21 is controlled. Then process 1 ends. It is noted that the order of steps 301 and 303 is not limited to the order shown in FIG. 3.

According to at least some example embodiments, the operation of the learning module 21 is controlled in S301 independently from the operation of the inference module 22 and operation of the action module 23 which is controlled also in step S303, for example. According to at least some example embodiments, operations of the learning module 21, the inference module 22 and the action module 23 are controlled independently.

According to at least some example embodiments, the cognitive function 20 controls the operations of the learning module 21, the inference module 22 and the action module 23.

According to at least some example embodiments, an external entity controls the operations of the learning module 21, the inference module 22 and the action module 23 via interfaces 24 of the cognitive function 20. According to at least some example implementations, the external entity comprises the control unit 10. According to at least some example embodiments, the external entity is part of the network.

According to at least some example embodiments, the cognitive function 20 and the external entity control the operations of the learning module 21, the inference module 22 and the action module 23.

It is noted that the modules 21, 22 and 23 and interfaces 24 may be implemented by software, hardware, firmware, circuitry or any combination thereof.

According to at least some example embodiments, in case in step S301 operation of the learning module 21 is halted and/or restarted, in step S303 at least one of operation of the inference module 22 and the action module 23 of the cognitive function 20 is controlled independently from the halting and/or restarting the operation of the learning module 21.

According to at least some example embodiments, in S301 the operation of the learning module 21 is halted upon detection of an exceptional state of specific elements in the network that are observed by the learning module 21. According to at least some example embodiments, the detection is made by at least one of the cognitive function 20 and the external entity.

According to at least some example embodiments, for halting the operation of the learning module 21, in S301 a learning state of the learning module 21 is set to a first predetermined value. For example, the first predetermined value indicates an administrative state of the learning module 21 of "locked" or "shutting down", or an operational state of the learning module 21 of "disabled", which will be described in more detail later on.

According to at least some example embodiments, for restarting the operation of the learning module 21, in S301 the learning state of the learning module 21 is set from the first predetermined value to a second predetermined value. For example, the second predetermined value indicates an administrative state of the learning module 21 of "unlocked", or an operational state of the learning module 21 of "enabled", which will be described in more detail later on.

According to at least some example embodiments, for controlling the operation of the inference module 22, in step S303 an inference state of the inference module is set independently from the setting of the learning state of the learning module. According to at least some example embodiments, in step S303 the inference state of the inference module is set independently from the setting of the learning state of the learning module and independently from a setting of an action state of the action module.

According to at least some example embodiments, for controlling the operation of the action module 23, in step S303 the action state of the action module is set independently from the setting of the learning state of the learning module and the setting of the inference state of the inference module.

According to at least some example embodiments, the inference state and the action state are set to the first or second predetermined value.

According to at least some example embodiments, at least one of the learning state, the inference state and the action state is set to the first predetermined value upon detection of a first predetermined event. For example, the first predetermined event is detected by at least one of the cognitive function 20 and the external entity.

According to at least some example embodiments, at least one of the learning state, the inference state and the action state is set to the second predetermined value upon detection of a second predetermined event. For example, the second predetermined event is detected by at least one of the cognitive function 20 and the external entity.

According to at least some example embodiments, the learning state comprises first and second learning states, the inference state comprises first and second inference states, and the action state comprises first and second action states.

According to at least some example implementations, the cognitive function 20 comprises an administrative state and an operational state of state variables according to a state management model for resources. Each of the first learning state, the first inference state and the first action state complies with the administrative state, and each of the second learning state, the second inference state and the second action state complies with the operational state.

According to at least some example embodiments, the cognitive function 20 further comprises an availability status according to the state management model for resources. The learning state further comprises a third learning state, the inference state further comprises a third inference state, and the action state further comprises a third action state.

According to at least some example implementations, the first predetermined value indicates at least one of the following: locked, shutting down and disabled, and the second predetermined value indicates at least one of the following: unlocked and enabled.

According to at least some example implementations, the administrative state is set by the external entity via the interfaces 24, and the operational state is set by the cognitive function 20.

According to at least some example implementations, upon detecting a third predetermined event, e.g. upon detecting that retraining the cognitive function 20 is required, the cognitive function 20 sets at least one of the third learning state, the third inference state and the third action state to a third predetermined value and transmits, via the interfaces 24, information to the network. The third predetermined value indicates "degraded" or "failed".

As mentioned above, according to at least some example implementations, a state management model for resources is used for controlling cognitive network functions. This model defines a number of state variables, including an administrative state, which may be either "unlocked", "locked" or "shutting down". When set to "locked", the particular resource will suspend the services it is offering. "Shutting down" enables a graceful shutdown, where the resource will not accept new consumers for the service and the service is suspended only after the last user has stopped using it. Changing the administrative state to "unlocked" resumes the service. Additionally, an operational state is defined, with which a resource may inform if it is able to provide its intended service fully, or if there are degradations or even a complete service interruption. The difference with the administrative and the operational states is that the administrative state offers the control interface for a management service (e.g. the above-described external entity via the interfaces 24) to either suspend or resume the services of a resource, whereas the operational state allows the resource (e.g. the cognitive function 20 via the interfaces 24) to report and indicate its own internal status and capabilities to the management service.

Figure 4:
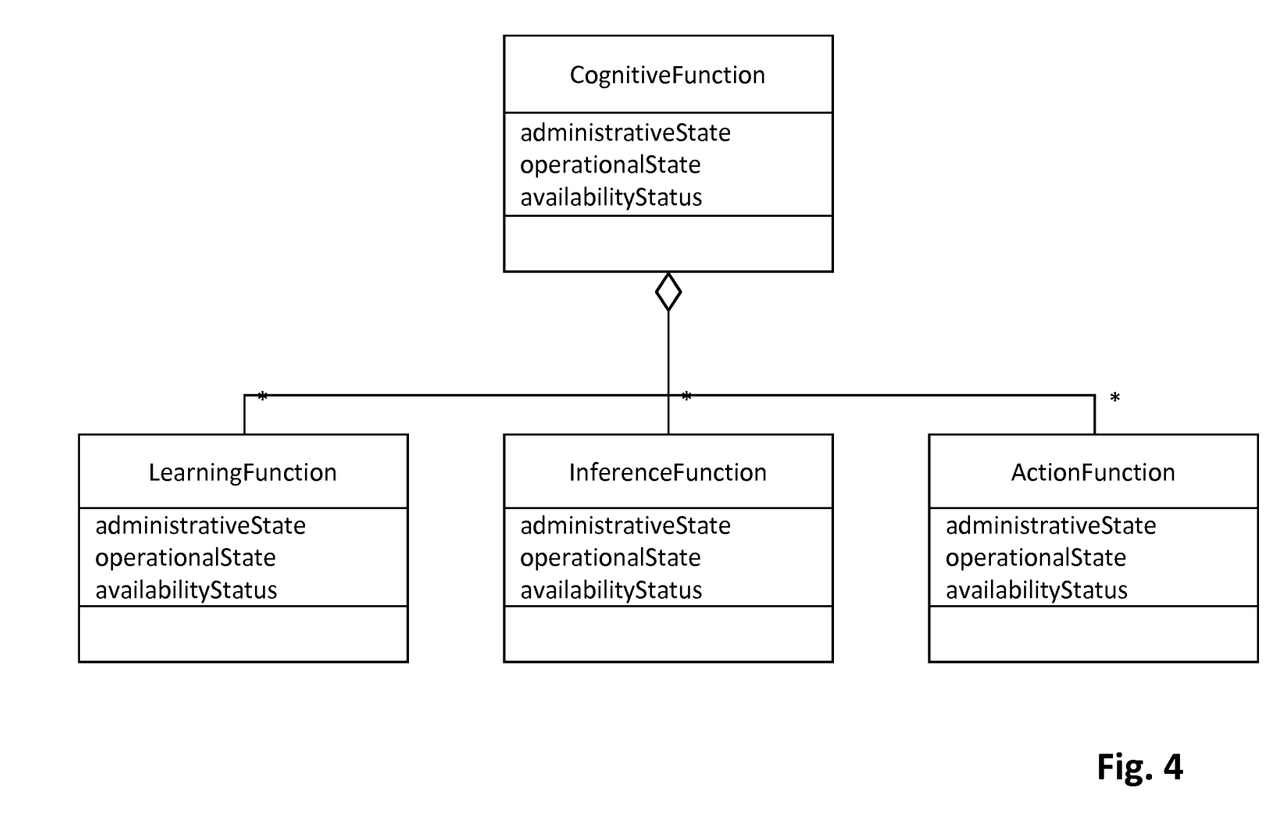
FIG. 4 shows a schematic diagram illustrating a configuration for controlling cognitive functions according to at least some example implementations.

According to at least some example implementations, the cognitive function 20 of FIG. 2 is modelled as shown in FIG. 4. According to FIG. 4, the cognitive function 20 (referred to as "CognitiveFunction" in FIG. 4) is modelled as an aggregate of the learning module 21 (referred to as "LearningFunction" in FIG. 4) which models an observation step of the cognitive function 20, the inference module 22 (referred to as "InferenceFunction" in FIG. 4) which models an inference step of the cognitive function 20, and actions the cognitive function 20 decides, plans and deploys based on insights from the inference are modelled as the action module 23 (referred to as "ActionFunction" in FIG. 4).

The LearningFunction, the InferenceFunction and the ActionFunction modelling the CognitiveFunction each comprise an administrative state variable "administrativeState", an operational state variable "operationalState" and an availability state variable "availabilityStatus". Note that FIG. 4 depicts only attributes relevant for the state management. However, the model objects may contain additional parameters.

According to at least some example implementations, state management can be applied to the modelled objects for the administrative, the operational and the availability states of the LearningFunction, the InferenceFunction and the ActionFunction. This can be done either to control the behavior of the cognitive network function 20, or for the cognitive network function 20 itself to indicate problems or ML-model life-cycle management related states.

If the external entity, such as a management service, wants to suspend learning of the cognitive function 20, it sets the administrativeState of the LearningFunction of the CognitiveFunction to "locked", in which case the learning is suspended. Setting the administrativeState of the LearningFunction again to "unlocked", the learning resumes. The described state management for the LearningFunction is especially designed for functions using reinforcement learning that are learning interactively during runtime. Similarly, if the cognitive function 20 itself detects that it is not able to learn from the data it is receiving, it can indicate this by setting the operationalState of the LearningFunction to, for example, "disabled".

According to at least some example implementations, in case the cognitive function 20 is no longer able to infer from the input data it is receiving, the cognitive function 20 indicates this by setting the operationalState of the InferenceFunction to "disabled".

According to at least some example implementations, the cognitive function 20 detects that the current model is not performing well and indicates this with an availabilityStatus of the InferenceFunction "degraded" or "failed". For example, in case the cognitive function 20 detects that its AI/ML model is outdated and needs retraining, if it is still able to do inference with the model, it indicates this by setting the availabilityStatus of the InferenceFunction to "degraded", while its operationalState is still "enabled", because it is still able to infer, only with limited performance. In case the model, or the input data, gets corrupted in a way that the cognitive function is no longer able to do inference, this is indicated by setting the operationalState of the InferenceFunction to "disabled" and the availabilityStatus to "failed".

According to at least some example implementations, if the external entity, e.g. a management entity, wants to suspend the inference, it sets the administrativeState of the InferenceFunction to "locked".

According to at least some example implementations, if any actions are to be suspended, the administrativeState of the ActionFunction is set to "locked" by the external entity. Similarly, if the cognitive function 20 is not able to act based on the insights, e.g. it cannot understand the inference results, it indicates this by setting the operationalState of the ActionFunction to "disabled".

The CognitiveFunction may also have the administrativeState, the operationalState and the availabilityStatus as a whole, which governs the state of the whole function including all the constituent parts. For example, setting the administrativeState of a CognitiveFunction to "locked" suspends all the learning, inference and action.

Figure 5:
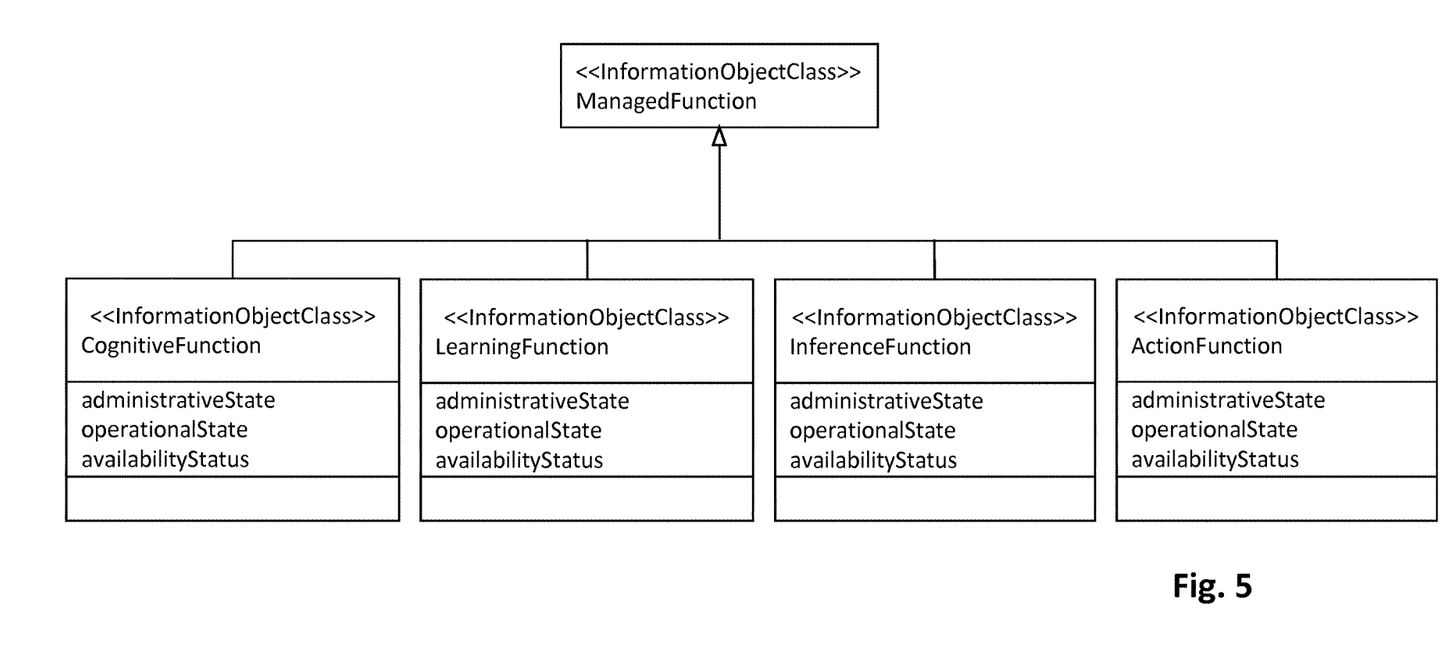
FIG. 5 shows a schematic diagram illustrating an IOC inheritance diagram according to an example implementation.

According to at least some example implementations in 3GPP, the cognitive function 20 of FIG. 2 is implemented as Information Object Classes (IOCs) in the 3GPP Generic Network Resource Model. FIG. 5 shows an IOC class inheritance diagram in 3GPP Generic NRM.

As shown in FIG. 5, the CognitiveFunction, the LearningFunction, the InferenceFunction and the ActionFunction of FIG. 4 are implemented as IOC "Managed Function".

Figure 6:
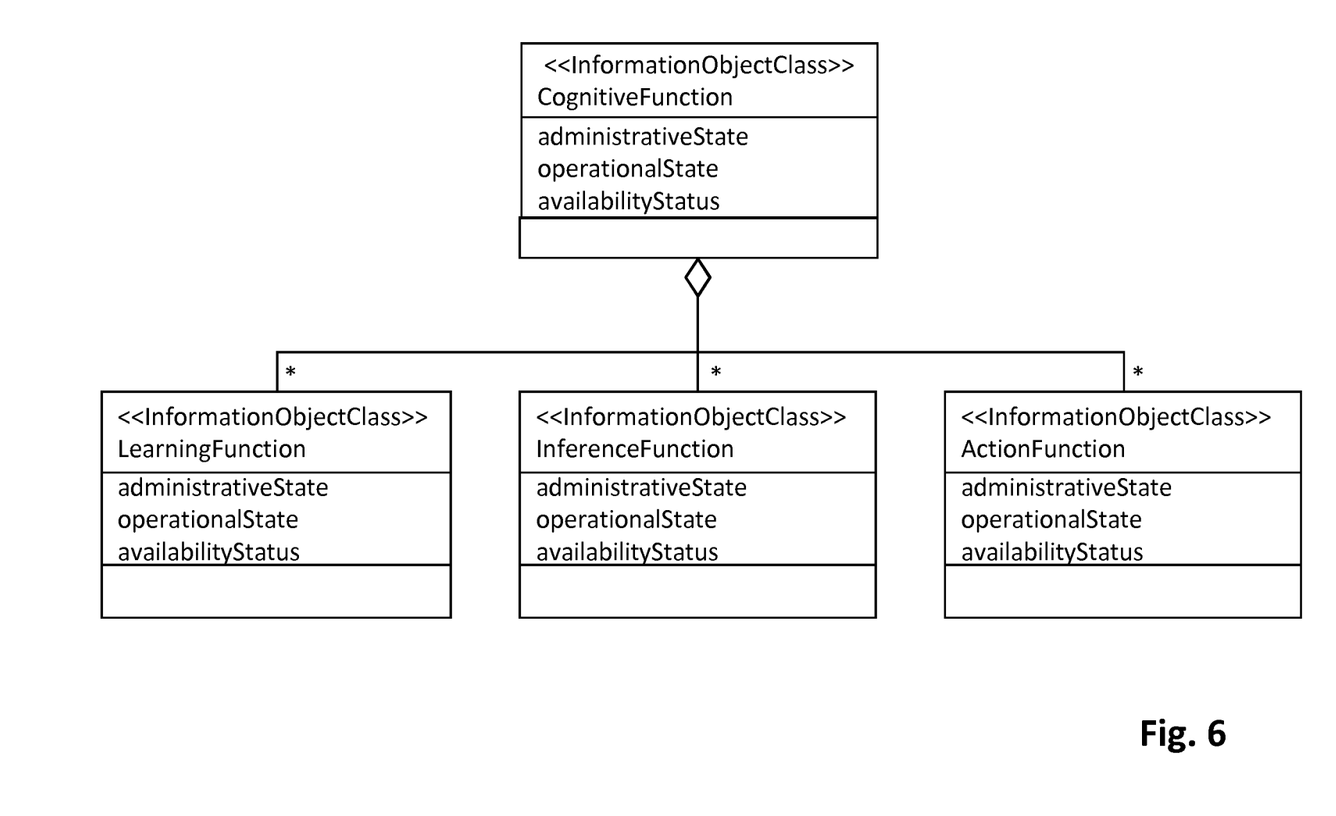
FIG. 6 shows a schematic diagram illustrating IOC containment according to the example implementation.

FIG. 6 depicts a containment of the IOCs according to at least some example implementations in 3GPP.

It is noted that the CognitiveFunction IOC is not limited to containing all three LearningFunction, InferenceFunction and ActionFunction IOCs. For example, the action may be decided and taken by another function based on the insights from a cognitive function. Typically, the CognitiveFunction IOC comprises at most one of each of Learning Function, InferenceFunction and ActionFunction, but in some cases even several of these may be contained in one CognitiveFunction. Also, it is noted that FIGS. 5 and 6 depicts only the attributes relevant for the state management. However, the IOCs may contain additional parameters.

According to an aspect, an apparatus for controlling cognitive functions in a network is provided. According to an example implementation, the apparatus comprises the control unit 10 of FIG. 1. In addition or according to an alternative example implementation, the apparatus comprises the cognitive function 20 of FIG. 2. In addition or according to an alternative example implementation, the apparatus performs process 1 of FIG. 3.

The cognitive functions controlled by the apparatus each comprises a learning module adapted to observe characteristics of the network and an inference module adapted to conclude, from the characteristics observed by the learning module, on a behavior of the network resulting from the observed characteristics. The apparatus comprises means for halting and/or restarting operation of the learning module of a cognitive function of the cognitive functions, and means for controlling operation of the inference module of the cognitive function independently from the halting and/or restarting the operation of the learning module of the cognitive function.

According to at least some example embodiments, the apparatus further comprises means for halting operation of the learning module upon detection of an exceptional state of specific elements in the network that are observed by the learning module.

According to at least some example embodiments, each of the cognitive functions further comprises an action module adapted to plan, from the behavior of the network concluded by the inference module, specific actions to affect an overall behavior of the network, and the apparatus further comprises means for controlling operation of the action module of the cognitive function independently from the halting and/or restarting the operation of the learning module of the cognitive function and the controlling the operation of the inference module of the cognitive function.

According to at least some example embodiments, the halting the operation of the learning module comprises setting a learning state of the learning module to a first predetermined value.

According to at least some example embodiments, the restarting the operation of the learning module comprises setting the learning state of the learning module from the first predetermined value to a second predetermined value.

According to at least some example embodiments, the controlling the operation of the inference module comprises setting an inference state of the inference module independently from the setting of the learning state of the learning module.

According to at least some example embodiments, the controlling the operation of the action module comprises setting an action state of the action module independently from the setting of the learning state of the learning module and the setting of the inference state of the inference module.

According to at least some example embodiments, the setting the inference state of the inference module comprises setting the inference state to the first or second predetermined value.

According to at least some example embodiments, the setting the action state of the action module comprises setting the action state to the first or second predetermined value.

According to at least some example embodiments, the apparatus further comprises means for setting at least one of the learning state, the inference state and the action state to the first predetermined value upon detection of a first predetermined event.

According to at least some example embodiments, the apparatus further comprises means for setting at least one of the learning state, the inference state and the action state to the second predetermined value upon detection of a second predetermined event.

According to at least some example embodiments, the learning state of the learning module comprises a first learning state, and the setting the learning state to the first or second predetermined value comprises setting the first learning state to the first or second predetermined value by an external entity.

According to at least some example embodiments, the apparatus comprises the external entity. According to at least some example embodiments, the apparatus comprises the external entity but does not comprise the cognitive function.

According to at least some example embodiments, the inference state of the inference module comprises a first inference state, and the setting the inference state to the first or second predetermined value comprises setting the first inference state to the first or second predetermined value by the external entity.

According to at least some example embodiments, the action state of the action module comprises a first action state, and the setting the action state to the first or second predetermined value comprises setting the first action state to the first or second predetermined value by the external entity.

According to at least some example embodiments, the apparatus further comprises means for setting at least one of the learning state, the inference state and the action state to the first or second predetermined value by the external entity via a first interface between the external entity and the cognitive function which comprises the learning module, the inference module or the action module, respectively.

According to at least some example embodiments, the learning state of the learning module comprises a second learning state, and the setting the learning state to the first or second predetermined value comprises setting the second learning state to the first or second predetermined value by the cognitive function comprising the learning module.

According to at least some example embodiments, the inference state of the inference module comprises a second inference state, and the setting the inference state to the first or second predetermined value comprises setting the second inference state to the first or second predetermined value by the cognitive function comprising the inference module.

According to at least some example embodiments, the action state of the action module comprises a second action state, and the setting the action state to the first or second predetermined value comprises setting the second action state to the first or second predetermined value by the cognitive function comprising the action module.

According to at least some example embodiments, the learning state of the learning module comprises a third learning state.

According to at least some example embodiments, the inference state of the inference module comprises a third inference state.

According to at least some example embodiments, the action state of the action module comprises a third action state.

According to at least some example embodiments, the apparatus further comprises means for, upon detecting a third predetermined event, setting, by the cognitive function, comprising at least the learning module and the inference module, at least one of the third learning state, the third inference state and the third action state to a third predetermined value and transmitting, via a second interface between the cognitive function and the network, information to the network.

According to at least some example embodiments, each of the cognitive functions comprises an administrative state, an operational state and an availability status of state variables according to a state management model for resources.

According to at least some example embodiments, each of the first learning state, the first inference state and the first action state complies with the administrative state of the state variables according to the state management model for resources.

According to at least some example embodiments, each of the second learning state, the second inference state and the second action state complies with the operational state of the state variables according to the state management model for resources.

According to at least some example embodiments, each of the third learning state, the third inference state and the third action state complies with the availability status of the state variables according to the state management model for resources.

According to at least some example embodiments, the first predetermined value indicates at least one of the following: locked, shutting down and disabled.

According to at least some example embodiments, the second predetermined value indicates at least one of the following: unlocked and enabled.

According to at least some example embodiments, the third predetermined value indicates degraded or failed.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for controlling cognitive functions in a network, the cognitive functions each comprising a learning module adapted to observe characteristics of the network and an inference module adapted to conclude, from the characteristics observed by the learning module, on a behavior of the network resulting from the observed characteristics, the method comprising:
   halting and/or restarting operation of the learning module of a cognitive function of the cognitive functions;
   controlling operation of the inference module of the cognitive function independently from the halting and/or restarting the operation of the learning module of the cognitive function; and
   upon detecting a predetermined event, setting, via a first interface, at least one of a learning state for the learning module or an inference state for the inference model to a first predetermined value and transmitting, via the first interface or a second interface, the at least one of the learning state and the inference state to the network.

2. The method of claim 1, further comprising:
halting operation of the learning module upon detection of an exceptional state of specific elements in the network that are observed by the learning module.

3. The method of claim 1, wherein each of the cognitive functions further comprises an action module adapted to plan, from the behavior of the network concluded by the inference module, specific actions to affect an overall behavior of the network, wherein the method further comprises:
controlling operation of the action module of the cognitive function independently from the halting and/or restarting the operation of the learning module of the cognitive function and the controlling the operation of the inference module of the cognitive function.

4. The method of claim 1, wherein
the halting the operation of the learning module comprises setting the learning state of the learning module to the first predetermined value, and/or
the restarting the operation of the learning module comprises setting the learning state of the learning module from the first predetermined value to a second predetermined value, and/or
the controlling the operation of the inference module comprises setting the inference state of the inference module independently from the setting of the learning state of the learning module.

5. The method of claim 4, wherein
the setting the inference state of the inference module comprises setting the inference state to the first or second predetermined value.

6. The method of claim 4, further comprising:
setting at least one of the learning state and the inference state to the first predetermined value upon detection of the first predetermined event, and/or
setting at least one of the learning state and the inference state to the second predetermined value upon detection of a second predetermined event.

7. The method of claim 4, wherein
the learning state of the learning module comprises a first learning state, and the setting the learning state to the first or second predetermined value comprises setting the first learning state to the first or second predetermined value by an external entity, and/or
the inference state of the inference module comprises a first inference state, and the setting the inference state to the first or second predetermined value comprises setting the first inference state to the first or second predetermined value by the external entity, wherein the setting the learning state and/or the setting the inference state to the first or second predetermined value by the external entity comprises setting the learning state and/or setting the inference state to the first or second predetermined value by the external entity via the first interface between the external entity and the cognitive function which comprises the learning module and the inference module.

8. The method of claim 7, wherein
the learning state of the learning module comprises a second learning state, and the setting the learning state to the first or second predetermined value comprises setting the second learning state to the first or second predetermined value by the cognitive function comprising the learning module, and/or
the inference state of the inference module comprises a second inference state, and the setting the inference state to the first or second predetermined value comprises setting the second inference state to the first or second predetermined value by the cognitive function comprising the inference module.

9. The method of claim 8, wherein
the learning state of the learning module comprises a third learning state and/or
the inference state of the inference module comprises a third inference state, the method further comprising:
upon detecting a third predetermined event, setting, by the cognitive function, comprising at least the learning module and the inference module, at least one of the third learning state and the third inference state to a third predetermined value and transmitting, via the second interface between the cognitive function and the network, information to the network.

10. The method of claim 8, wherein
each of the cognitive functions comprises an administrative state, an operational state and an availability state of state variables according to a state management model for resources, and/or
each of the first learning state and the first inference state complies with the administrative state of the state variables according to the state management model for resources, and/or
each of the second learning state and the second inference state complies with the operational state of the state variables according to the state management model for resources, and/or
each of the third learning state and the third inference state complies with the availability status of the state variables according to the state management model for resources, and/or
the first predetermined value indicates at least one of the following: locked, shutting down and disabled, and/or
the second predetermined value indicates at least one of the following: unlocked and enabled, and/or
the third predetermined value indicates degraded or failed.

11. An apparatus for controlling cognitive functions in a network, the cognitive functions each comprising a learning module adapted to observe characteristics of the network and an inference module adapted to conclude, from the characteristics observed by the learning module, on a behavior of the network resulting from the observed characteristics, the apparatus comprising
at least one processor; and
at least one memory including computer program code, the at least one memory and the computer program code configured to, with the at least one processor, cause the apparatus at least to perform:
halting and/or restarting operation of the learning module of a cognitive function of the cognitive functions;
controlling operation of the inference module of the cognitive function independently from the halting and/or restarting the operation of the learning module of the cognitive function; and
upon detecting a predetermined event, setting, via a first interface, at least one of a learning state for the learning module or an inference state for the inference model to a first predetermined value and transmitting, via the first interface or a second interface, the at least one of the learning state and the inference state to the network.

12. The apparatus of claim 11, wherein the at least one memory and the computer program code are configured to, with the at least one processor, cause the apparatus to further perform:
 halting operation of the learning module upon detection of an exceptional state of specific elements in the network that are observed by the learning module.

13. The apparatus of claim 11, wherein each of the cognitive functions further comprises an action module adapted to plan, from the behavior of the network concluded by the inference module, specific actions to affect an overall behavior of the network, wherein the at least one memory and the computer program code are configured to, with the at least one processor, cause the apparatus to further perform:
 controlling operation of the action module of the cognitive function independently from the halting and/or restarting the operation of the learning module of the cognitive function and the controlling the operation of the inference module of the cognitive function.

14. The apparatus of claim 11, wherein
 the halting the operation of the learning module comprises setting the learning state of the learning module to the first predetermined value, and/or
 the restarting the operation of the learning module comprises setting the learning state of the learning module from the first predetermined value to a second predetermined value, and/or
 the controlling the operation of the inference module comprises setting the inference state of the inference module independently from the setting of the learning state of the learning module.

15. The apparatus of claim 14, wherein
 the setting the inference state of the inference module comprises setting the inference state to the first or second predetermined value.

16. The apparatus of claim 14, wherein the at least one memory and the computer program code are configured to, with the at least one processor, cause the apparatus to further perform:
 setting at least one of the learning state and the inference state to the first predetermined value upon detection of the first predetermined event, and/or
 setting at least one of the learning state and the inference state to the second predetermined value upon detection of a second predetermined event.

17. The apparatus of claim 14, wherein
 the learning state of the learning module comprises a first learning state, and the setting the learning state to the first or second predetermined value comprises setting the first learning state to the first or second predetermined value via the first interface between the apparatus and the cognitive function, and/or
 the inference state of the inference module comprises a first inference state, and the setting the inference state to the first or second predetermined value comprises setting the first inference state to the first or second predetermined value via the first interface between the apparatus and the cognitive function.

18. The apparatus of claim 14, wherein
 the learning state of the learning module comprises a second learning state, and the setting the learning state to the first or second predetermined value comprises setting the second learning state to the first or second predetermined value by the cognitive function comprising the learning module, and/or
 the inference state of the inference module comprises a second inference state, and the setting the inference state to the first or second predetermined value comprises setting the second inference state to the first or second predetermined value by the cognitive function comprising the inference module.

19. The apparatus of claim 18, wherein
 the learning state of the learning module comprises a third learning state and/or
 the inference state of the inference module comprises a third inference state and/or
 an action state of an action module comprises an action state, and wherein the at least one memory and the computer program code are configured to, with the at least one processor, cause the apparatus to further perform:
 upon detecting a third predetermined event, setting, by the cognitive function, comprising at least the learning module and the inference module, at least one of the third learning state, the inference state and the action state to a third predetermined value and transmitting, via the second interface between the cognitive function and the network, information to the network.

20. The apparatus of claim 19, wherein
 each of the cognitive functions comprises an administrative state, an operational state and an availability status of state variables according to a state management model for resources, and/or
 each of the first learning state and the first inference state complies with the administrative state of the state variables according to the state management model for resources, and/or
 each of the second learning state and the second inference state complies with the operational state of the state variables according to the state management model for resources, and/or
 the first predetermined value indicates at least one of the following: locked, shutting down and disabled, and/or
 the second predetermined value indicates at least one of the following: unlocked and enabled, and/or
 the third predetermined value indicates degraded or failed.

* * * * *